United States Patent [19]

Muehleisen

[11] Patent Number: 4,679,226

[45] Date of Patent: Jul. 7, 1987

[54] COMPUTER SECURITY GUARD CIRCUIT

[75] Inventor: Thomas C. Muehleisen, Cuyahoga Falls, Ohio

[73] Assignee: Alltel Corporation, Hudson, Ohio

[21] Appl. No.: 745,782

[22] Filed: Jun. 17, 1985

[51] Int. Cl.⁴ ........................ H04M 11/00; H04L 9/00
[52] U.S. Cl. ........................................ 379/95; 379/102; 379/188; 178/22.08; 380/25
[58] Field of Search ........................... 179/2 DP, 2 A; 178/22.08, 22.09; 379/93, 95, 102, 105, 188, 190, 199

[56] References Cited

U.S. PATENT DOCUMENTS

| | | | |
|---|---|---|---|
| 3,641,270 | 2/1972 | Ohshima et al. | 179/2 A |
| 3,984,637 | 10/1976 | Caudill et al. | 179/2 DP |
| 4,146,754 | 3/1979 | Rose | 379/102 |
| 4,304,967 | 12/1981 | Gretczko | 179/2 A |
| 4,310,720 | 1/1982 | Check, Jr. | 178/22.08 |
| 4,430,728 | 2/1984 | Beitel et al. | 364/900 |
| 4,471,489 | 9/1984 | Konetski et al. | 375/5 |
| 4,484,306 | 11/1984 | Kulczyckyj et al. | 364/900 |
| 4,493,947 | 1/1985 | Loveless | 179/2 A |
| 4,499,556 | 2/1985 | Halpern | 364/900 |
| 4,531,023 | 7/1985 | Levine | 179/2 R |
| 4,546,213 | 10/1985 | Dick | 179/2 A |
| 4,604,499 | 8/1986 | Hughes | 379/95 |

*Primary Examiner*—Gene Z. Rubinson
*Assistant Examiner*—Matthew E. Connors
*Attorney, Agent, or Firm*—Renner, Kenner, Greive, Bobak & Taylor

[57] ABSTRACT

A circuit (16) is designed to prevent unauthorized access to a remote device such as a computer (10) over a communications system such as a telephone network (12). A remote computer terminal (13) is connected to the telephone network (12) through a conventional modem (14). At the remote location of computer (10), circuit (16) is connected between computer (10) and another modem (15). Circuit (16) is also connected to the telephone network (12) to receive a signal therefrom which connects modem (15) through circuit (16) to computer (10) to temporarily access the same. The connection, however, is disconnected after a predetermined time period unless circuit (16) receives a second signal from the telephone network (12) before the expiration of that predetermined time period.

24 Claims, 2 Drawing Figures

COMPUTER SECURITY GUARD CIRCUIT

TECHNICAL FIELD

This invention relates to a method and apparatus for guarding remote devices against unauthorized access over communication lines. More particularly, this invention relates to a method and apparatus which protects computers from unauthorized accessing over a telephone line.

BACKGROUND ART

The remote accessing of computers over telephone lines is a common data transmission process. Access to the computer is normally gained by dialing a secret telephone number. As long as the secrecy of that number is maintained, unauthorized access to the computer is prevented. However, with the advent of more sophisticated computer programming and the popularity of home computers, would-be computer thiefs are finding ways to determine the secret telephone numbers.

For example, a computer can be programmed to sequentially dial every telephone number in every telephone exchange of interest. Once dialed, the computer can determine from the answer tone whether the telephone number is that of a normal user or whether a computer is being accessed thereby. Then the computer of the would-be thief can make a list of all computer-connected telephone numbers for potential unauthorized access by the thief.

The only potential solutions to this problem of which I am aware, all require the utilization of complex equipment to receive and send coded information such that in addition to accessing the computer by dialing a telephone number, certain codes must be transmitted to fully activate the communications link. As long as this code is kept secret and as long as it is complex enough that the would-be thief cannot program his computer to sequentially run through all possible codes, these systems are operable. However, the complexity of the specialized equipment involved and the need to have such equipment at the remote location and the computer location makes it cost prohibitive.

DISCLOSURE OF THE INVENTION

It is thus a primary object of the present invention to provide a method and apparatus to prevent unauthorized access to a remote device, such as a computer, over communication networks, such as telephone lines.

It is another object of the present invention to provide a method and apparatus, as above, which can be utilized inexpensively, yet reliably.

It is a further object of the present invention to provide a method and apparatus, as above, which utilizes two telephone numbers to access a computer, neither of which can be detected as being associated with a computer.

It is yet another object of the present invention to provide a method and apparatus, as above, wherein access to the computer cannot be gained unless the two telephone numbers are dialed within a predetermined time period of each other.

These and other objects of the present invention which will become apparent from the description to follow are accomplished by the improvements hereinafter described and claimed.

In general, a circuit for preventing unauthorized access to a remote device over a communications network is designed, in its preferred environment, to be used to protect a remote computer from unauthorized access over a telephone line. In that environment, a computer terminal is connected to the telephone network through a conventional modem. At the remote location, the circuit of the present invention is connected between another modem and the computer to be protected. The circuit is also connected to the telephone network to receive a signal therefrom, which signal connects the modem to the computer to temporarily enable the computer to be accessed. However, the connection is disconnected after a predetermined time period unless the circuit receives a second signal from the telephone network before the expiration of that predetermined time.

PREFERRED EMBODIMENT FOR CARRYING OUT THE INVENTION

Figure 1:
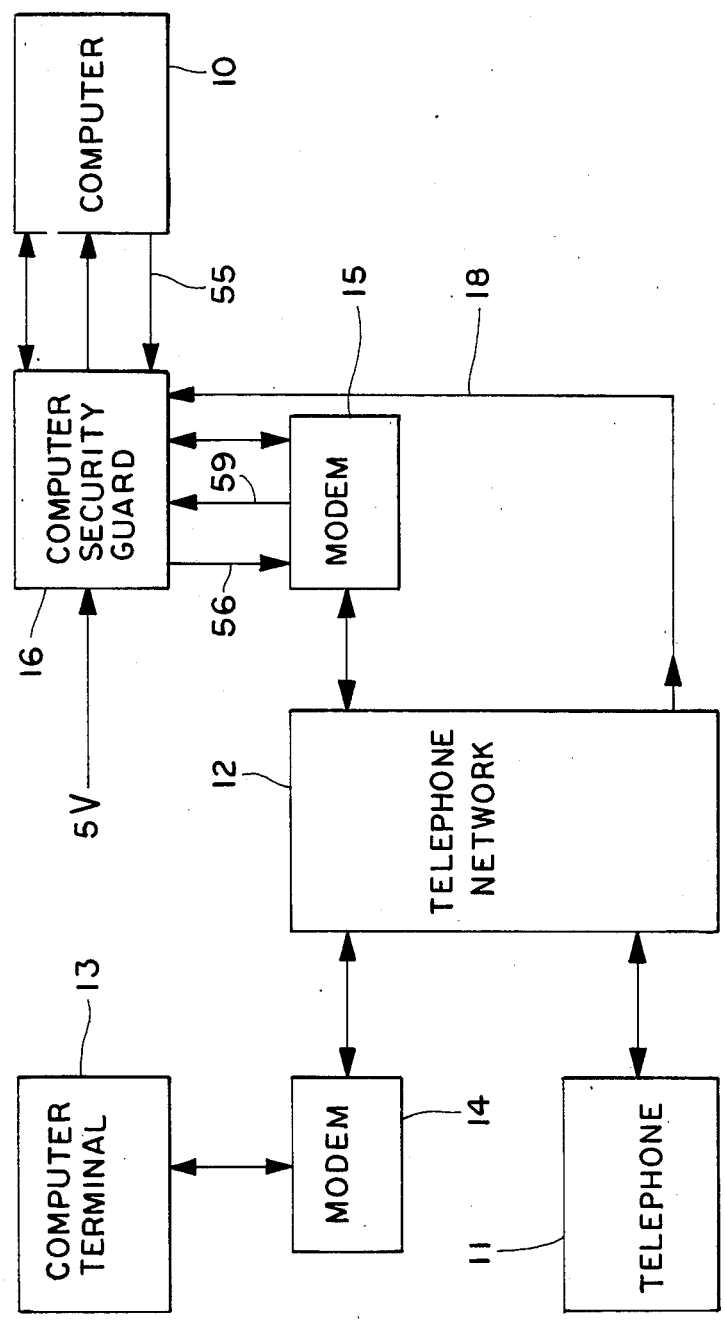
FIG. 1 is a block diagram showing the computer security guard of the present invention in a system for the remote access of a computer over a telephone communications network.

An overall system for the remote access of a computer through a telephone network is generally shown in FIG. 1. As shown, a computer 10 may be accessed by dialing a number on a telephone 11 conventionally connected to a telephone network 12 or may be accessed by dialing a number on a telephone associated with a conventional modem 14. Normally in the prior art, but not in the present invention, once access is gained to the computer 10, information may be put into or taken out of computer 10 by remote computer terminal 13 connected through modem 14 to telephone network 12. The signals from terminal 13 are received by another modem or interface 15 and forwarded to computer 10 through a computer security guard circuit 16 which is the subject of the present invention. The system shown in FIG. 1, except for the presence of circuit 16, is a conventional system for the remote access of a computer through a telephone network. But for circuit 16, anyone who had a computer terminal and modem, could access the computer if they knew the correct telephone number. However, the computer security guard circuit 16 acts to prevent any unauthorized use of the computer information.

Figure 2:
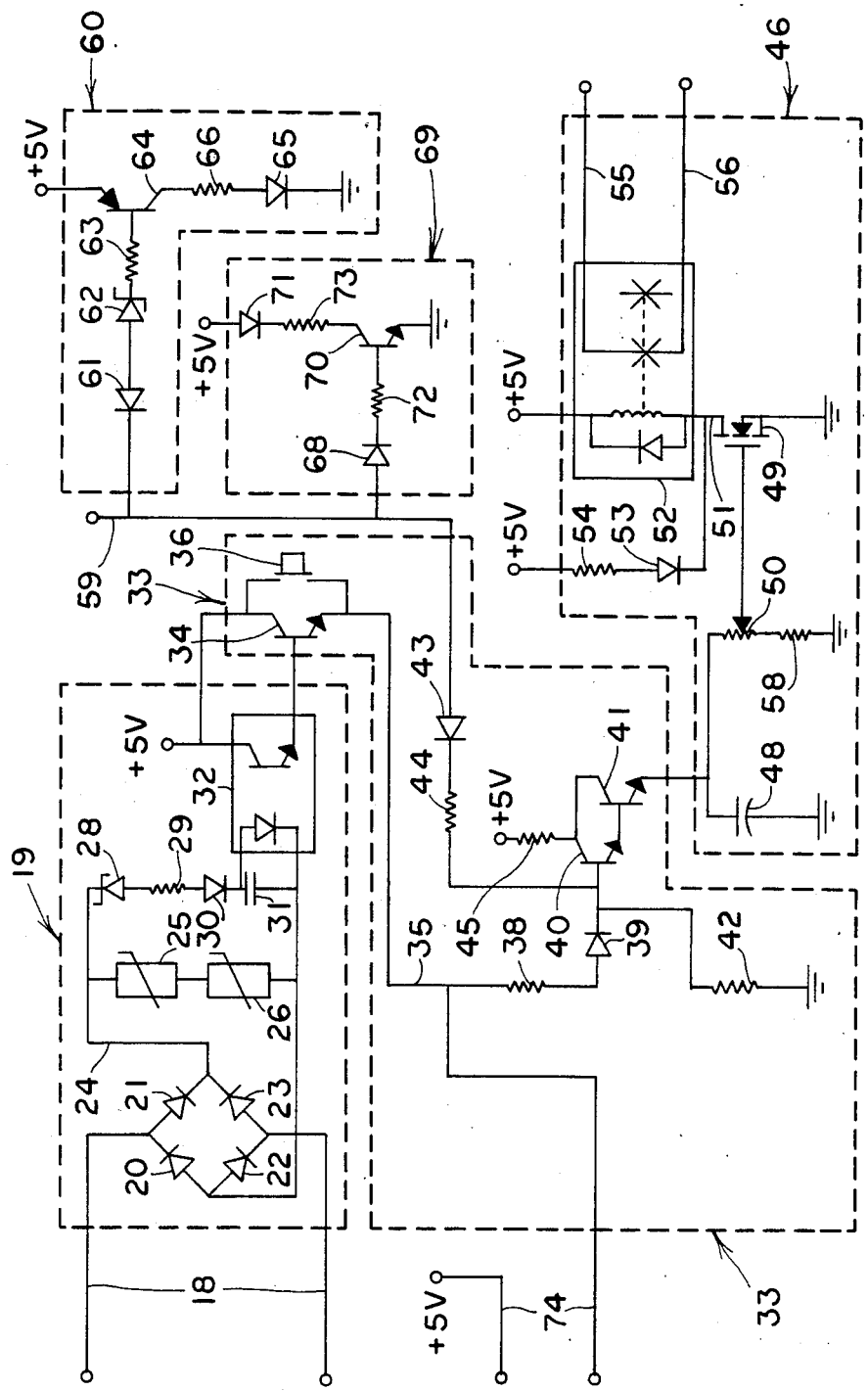
FIG. 2 is a circuit diagram of the computer security guard.

Computer security guard circuit 16 is shown in detail in FIG. 2. If the operator of the computer terminal 13 wishes to establish communications with computer 10, a security telephone number is dialed on telephone 11 which creates a ring signal on line 18 to circuit 16. This ring signal is typical of any telephone ring and it cannot be detected as being in any way associated with a computer. The ring signal is generally sinusoidal, typically varying around fifty-two volts, having a peak voltage of approximately one hundred fifty-eight volts. This signal on line 18 is received by a ring detection and coupling circuit, generally indicated by the numeral 19, which is part of circuit 16.

A plurality of diodes 20, 21, 22 and 23 of circuit 19 form a bridge which serves to full wave rectify the voltage on line 18 to assure that the voltage on line 24 out of the bridge is always positive. Conventional varistors 25 and 26 protect the rest of the circuitry in the event of abnormally high voltages on line 18 resulting in an undesirably high voltage on line 24.

The voltage on line 24 is received by a zener diode 28 and when that voltage is above a predetermined amount, for example sixty-two volts, indicative of a ring signal on line 18, zener diode 28 is activated and acts as a sixty-two volt battery. The current through zener diode 28 will rise and fall corresponding to the signal on line 24 as long as that signal is larger than the sixty-two volt level. A resistor 29 keeps the ring current small so that the ring signal is not stopped, as would be the case if the current were large. This current activates a light emitting diode 30 which illuminates a light which can be located on the panel of the device so that the presence of a ring signal can be observed, if desired. A capacitor 31 serves to filter undesirable noise in the ring current which flows into a conventional optical coupler 32 which isolates the timing circuit, to be hereinafter described, from the telephone line.

Activation of optical coupler 32 also provides the input signal to a driver circuit indicated generally by the numeral 33 in FIG. 2. A transistor 34, the collector of which is attached to a conventional five volt power supply, is turned on by optical coupler 32, and a five volt signal through conducting transistor 34 is provided on line 35. If desired, the exterior panel of the device may be provided with a push button 36 to directly supply the five volts on line 35, as for test purposes, without the need for a ring signal.

Current in line 35 is controlled by resistor 38 and passes through diode 39 to turn on transistors 40 and 41 coupled in a Darlington configuration. Resistor 42 prevents any leakage current from optical coupler 32 from accidentally activating transistors 40 and 41 without a ring signal. Diode 43 and resistor 44 of driver circuit 33 are utilized, in a manner to be hereinafter described, to enable the system to have several security guard circuits 16 connected in parallel.

Upon the activation of transistors 40 and 41, a five volt signal through resistor 45 of driver circuit 33 is presented to a timer and driver circuit generally indicated by the numeral 46. This signal charges timing capacitor 48 of circuit 46, the parameters of which can be selected such that it is fully charged after a desired number of ring signals 18, typically two or three ringing cycles. The amount or duration of this ring signal to fully charge capacitor 48 is a further security measure of the circuit because if the operator of the terminal is not aware that a certain number of ringing cycles are necessary, capacitor 48 will not be sufficiently charged to the threshold level of a field effect transistor 49, as is required.

When capacitor 48 is charged to this predetermined extend, field effect transistor 49 is turned on through potentiometer 50. The activation of transistor 49 pulls the voltage on line 51 low thereby activating a conventional reed relay 52 and turning on a light emitting diode 53 connected to five volts through resistor 54. The light on the panel of the device from diode 53 indicates that the security guard circuit 16 is in what can be called a "held" condition. This essentially means that relay 52 has connected the computer data terminal ready (DTR) output signal 55 to the DTR input 56 of the modem 15. This tells the modem that the computer is ready, allows the modem to receive an incoming or data set call on the modem telephone line for computer access and enables the modem to put out a carrier detect signal if an incoming call is received.

However, this data set call must be placed before capacitor 48 discharges through potentiometer 50 and resistor 58. If modem 15 does not receive an incoming call within the time period of the discharge of capacitor 48 below the threshold of transistor 49, the modem's carrier detect voltage on line 59 remains low or negative and transistor 49 turns off with relay 52 thereby disconnecting the modem DTR input 56 from the computer DTR output 55. The predetermined time for the discharge of capacitor 48 is determinable by the selection of the capacitor itself and the selection of the values of resistor 58 and potentiometer 50, with the time delay being changeable by adjustment of potentiometer 50. For example, a forty-seven microfarad capacitor 48, a five megohm potentiometer 50 and two megohm resistor 58 permits potentiometer 50 to be set giving a time delay in the range of two to three minutes.

With no data set telephone call having been received within that time period and with the carrier detect voltage on line 59 negative, a negative level detect circuit, indicated generally by the numeral 60, receives the signal on line 59 and a diode 61 and a zener diode 62 conduct. This pulls current through a resistor 63 from the base of a transistor 64 providing current to a light emitting diode 65 through a current regulating resistor 66. The light on the panel of the device from diode 65 indicates the non-reception of a carrier signal by modem 15. At this same time a diode 68 of a positive level detect circuit, generally indicated by the numeral 69, is reverse biased which maintains a transistor 70 and a light emitting diode 71 of that circuit off.

On the other hand, if the operator of terminal 13 calls modem 15 before capacitor 48 has discharged, the signal on line 59 becomes positive. This sends current through diode 43 and resistor 44 to maintain transistors 40 and 41 conducting which recharges capacitor 48 and maintains transistor 49 above its threshold. This, in turn, holds diode 53 on while reed relay 52 maintains the connection between DTR lines 55 and 56.

At the same time the positive signal on line 59 causes diode 68 of positive level detect circuit 69 to conduct with current passing through a resistor 72 to a transistor 70. Transistor 70 conducts and pulls current from five volts through a resistor 73 to light emitting diode 71 which lights up to indicate the presence of the carrier detect signal 59 from modem 15. Diode 61 of negative level detect circuit 60 is reverse biased at this time keeping transistor 64 and light emitting diode 65 off.

When the call is discontinued by the operator of terminal 13, modem 14 discontinues sending a signal to modem 15 and the carrier detect signal 59 again goes negative. This not only activates negative level detect circuit 60 and deactivates positive level detect circuit 69 but it also reverse biases diode 43 which turns off transistors 40 and 41. Capacitor 48 is thereby allowed to discharge to turn off transistor 49 and relay 52 unless another call is received before capacitor 48 falls below the threshold level of transistor 49. The computer and modem DTR signals 55 and 56 are thus disconnected and the security guard circuit 16 disables modem 15 from reaching computer 10.

Additional security guard circuits can be connected in parallel across leads 74 (FIG. 2). Only one security guard circuit needs to have the control telephone line 18 connected thereto so that one line may enable a plurality of modems 15. Diodes 39 and 43 serve to isolate the carrier detect 59 signals between different modems so that the signal of one modem cannot enable all the other modems.

It should thus be evident that a computer security guard circuit constructed according to the concept of the present invention will protect computers from being accessed by unauthorized people and therefore substantially improves the art and otherwise accomplishes the objects of the present invention.

I claim:

1. A system of communicating with a computer over a communications network comprising a computer terminal, a first modem connecting said computer terminal to the communications network, a second modem, a computer security guard circuit connected between said second modem and the computer, said computer security guard circuit also being directly connected to the communications network to receive a first call through the network and connecting said second modem to the computer upon the receipt thereof, said second modem being connected to the communications network to receive a second call through the network from said first mode, said second call passing from said second modem to said computer security guard circuit, and timing means within said computer security guard circuit to disconnect the second modem from the computer if said second call is not received by said computer security guard circuit within a predetermined time period after the receipt of said first call.

2. A system according to claim 1, wherein said computer security guard circuit includes means to detect the presence of said first call from the communications network and providing a first output signal in response thereto.

3. A system according to claim 2, wherein said computer security guard circuit includes means to display the detection of said first call from the communications network.

4. A system according to claim 2, wherein said computer security guard circuit includes driver means receiving said first ouput signal of said means to detect and providing a second output signal in response thereto.

5. A system according to claim 4, wherein said timing means receives said second output signal from said driver means and connects said second modem to the computer for said predetermined time period.

6. A system according to claim 5, wherein said driver means receives said second call through the network.

7. A system according to claim 6, wherein said computer security guard circuit includes means to detect and display the presence of said second call.

8. A system according to claim 6, wherein said computer security guard circuit includes means to detect and display the absence of said second call.

9. A system according to claim 1, wherein said timing means includes a capacitor which is charged when said computer security guard circuit receives said first call.

10. A system according to claim 9, wherein said timing means includes a transistor which conducts when said capacitor is charged above the threshold point of said transistor.

11. A system according to claim 10, wherein said timing means includes a relay activated by said transistor to connect said second modem to the computer as long as the charge on said capacitor is above the threshold point of said transistor.

12. A system according to claim 1, wherein said timing means includes means to adjust said predetermined time period.

13. A system according to claim 1, wherein the communications network is a telephone network and said first call is a sinusoidal ring signal created by dialing a telephone number.

14. A system according to claim 13, wherein said computer security guard circuit includes means receiving said ring signal and converting the same to a constant signal.

15. A system according to claim 14, wherein said computer security guard circuit includes driver means receiving said constant signal and providing an output signal, said timing means receiving the output signal of said driver means.

16. A circuit for preventing unauthorized access to a first remote device from a second remote device over a first communications line comprising, detection means receiving a call from a third remote device over a second communications line and providing a first output signal in response thereto, driver means receiving said output signal of said detection means and providing a second output signal in response thereto, and timing means receiving said second output signal from said driver means and establishing potential communications access with the first remote device from the second remote device for a predetermined time period, said driver means being capable of receiving a call from the second remote device over the first communications line which accesses the first remote device if said call from the second remote device is received within said predetermined time period.

17. A circuit according to claim 16, wherein said timing means includes a capacitor which is charged upon the receipt of said second output signal from said driver means.

18. A circuit according to claim 17, wherein said timing means includes a transistor which conducts when said capacitor is charged above the threshold point of said transistor.

19. A circuit according to claim 18, wherein said timing means includes a relay activated by said transistor to give said potential communication access to the first remote device from the second remote device as long as the charge on said capacitor is above the threshold point of said transistor.

20. A circuit according to claim 16, wherein said timing means includes means to adjust the predetermined time period.

21. A circuit according to claim 16, wherein said detection means includes means to display the detection of said call from said third remote device.

22. A circuit according to claim 16, further comprising means to detect and display the presence of said call from said second remote device.

23. A circuit according to claim 16, further comprising means to detect and display the absence of said call from said second remote device.

24. A circuit according to claim 16, further comprising means to test said timing means by providing a signal thereto in the absence of said call from said third remote device.

* * * * *